United States Patent [19]
Ball

[11] 3,868,974
[45] Mar. 4, 1975

[54] REINFORCED FLEXIBLE ARTICLES

[75] Inventor: Eric Ball, Newcastle Upon Tyne, England

[73] Assignee: Dunlop Holdings Limited, London, England

[22] Filed: July 26, 1971

[21] Appl. No.: 166,021

[30] Foreign Application Priority Data
June 5, 1970 Great Britain .................... 27336/70

[52] U.S. Cl. ................................ 138/129, 138/137
[51] Int. Cl. ................................ F16l 11/10
[58] Field of Search .......... 138/137, 138, 130, 129, 138/134, 145, 144, 132; 229/49; 206/59 C

[56] References Cited
UNITED STATES PATENTS

| | | | |
|---|---|---|---|
| 2,128,814 | 8/1938 | Gish | 138/129 X |
| 2,719,804 | 10/1955 | Carlson | 229/49 X |
| 2,723,705 | 11/1955 | Collins | 138/144 X |
| 2,747,616 | 5/1956 | Granahl | 138/132 X |
| 2,815,043 | 12/1957 | Kleiner | 138/144 |
| 2,854,031 | 9/1958 | Donaldson | 138/144 |
| 2,884,010 | 4/1959 | Fisher | 138/144 |
| 2,969,812 | 1/1961 | Ganahl | 138/137 X |
| 3,013,921 | 12/1961 | Jacobson | 138/129 X |
| 3,357,456 | 12/1967 | Gramey | 138/138 X |
| 3,502,113 | 3/1970 | Bjorksten | 138/129 |

FOREIGN PATENTS OR APPLICATIONS

| | | | |
|---|---|---|---|
| 829,980 | 3/1960 | Great Britain | |
| 25,977 | 1907 | Great Britain | 138/130 |

*Primary Examiner*—Herbert F. Ross
*Attorney, Agent, or Firm*—Stevens, Davis, Miller & Mosher

[57] ABSTRACT

A flexible article, for example a hose pipe, having a reinforced structure which is formed from at least one strip of reinforced material, each reinforcement strip comprising a plurality of longitudinally extending reinforcing filaments affixed to a carrier strip formed from a membrane of polymeric material, of which the following is a specification.

11 Claims, 3 Drawing Figures

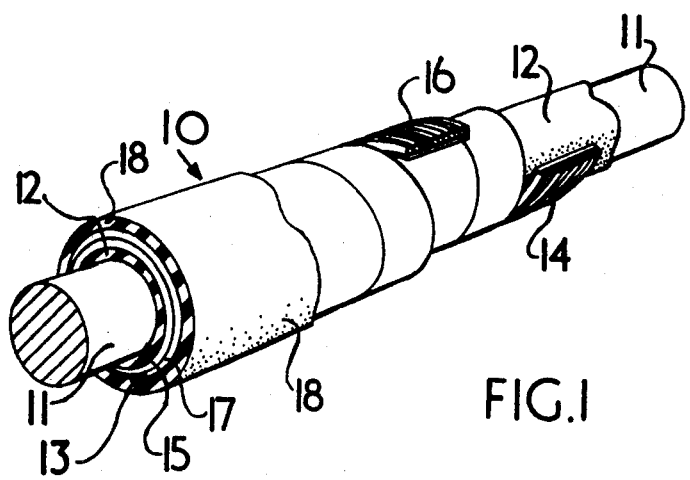
FIG.1
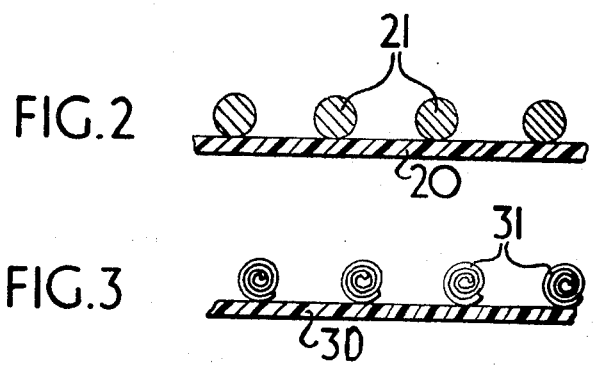
FIG.2
FIG.3

REINFORCED FLEXIBLE ARTICLES

This invention relates to flexible articles, and in particular to flexible articles having a reinforcement structure.

One object of the present invention is to provide a flexible article having an improved reinforcement structure.

According to one aspect of the invention a flexible article comprises a reinforcement structure formed from at least one strip of reinforcement material, each reinforcement strip comprising a plurality of longitudinally extending reinforcing filaments affixed to a carrier strip formed from a membrane of polymeric material.

The term "affixed to" means, in this specification and the appended claims, "applied to the surface only", differentiating the novel reinforcement material from prior reinforcement material structures in which cords are wholly or partially embedded in polymeric material.

In the manufacture of a reinforced flexible article such as a hose pipe it is shown to provide a reinforcement which consists of helically wound strips of rubber, in which are embedded, by calendering, spaced parallel reinforcing filaments which extend only in the longitudinal direction of the strip. The strips are bonded together and generally half of the strips are wound left handed and the other half are wound right handed.

A hose of this kind allows significant savings in cost of manufacture and materials as compared with hose pipes constructed with a woven fabric reinforcement. Not only is the calendered strip material cheaper than woven fabric, but the hose can be built up from the strip material by relatively inexpensive lapping machines. This kind of hose, however, has the disadvantage that unless the hose lining is relatively thick and has a high modulus of elasticity, it is not possible to use reinforcing filaments which shrink during vulcanization.

According to another aspect of the invention a hose pipe comprises a reinforcement structure formed from at least one helically wound strip of reinforcement material, each reinforcement strip comprising a plurality of longitudinally extending reinforcing filaments affixed to a carrier strip formed from a membrane of polymeric material.

Preferably the carrier strip has a thickness not exceeding 0.010 of an inch, and has an elongation at break in any direction of not more than 100 per cent.

According to another aspect of the invention a method of manufacture of a hose pipe comprises applying to a lining layer two or more helically wound strips of reinforcing material, at least one of the reinforcement strips comprising a plurality of longitudinally extending reinforcing filaments affixed to a carrier strip formed from a membrane of polymeric material.

According to a further aspect of the invention a method of manufacture of a hose pipe comprises helically winding onto a lining layer of a hose pipe a carrier strip formed from a membrane of polymeric material, helically winding a plurality of reinforcing filaments onto the carrier strip such that the filaments extend substantially longitudinally relative to the carrier strip, and affixing the reinforcing filaments to the carrier strip.

Preferably the hose pipe comprises a plurality of reinforcing layers each formed from a helically wound strip of reinforcing material, the reinforcement strips of successive layers being wound in opposite senses relative to one another.

Two embodiments of the invention will now be described, by way of example, with reference to the accompanying drawings (not to scale) in which:

FIG. 1 is a perspective view, partly in section, of a hose pipe on a building mandrel;

FIG. 2 is a cross-sectional view of one form of reinforcement strip, and

FIG. 3 is a cross-sectional view of another form of reinforcement strip.

In a first embodiment of the invention, illustrated in FIG. 1, a flexible hose pipe 10 is formed by extruding onto a building mandrel 11 a layer of polymeric material so as to form a lining layer 12 of the hose. A reinforcement structure 13 is then formed on the lining layer by helically winding a first reinforcement strip 14 so as to form a first reinforcement layer 15, and helically winding a second reinforcement strip 16 onto the first reinforcement layer, in an opposite sense thereto, so as to form a second reinforcement layer 17. A layer of polymeric material is then extruded on to the reinforcement structure so as to form a cover layer 18 of the hose pipe.

The hose pipe assembly is subsequently vulcanized in a conventional manner and the mandrel is then withdrawn.

FIG. 2 illustrates, in cross-section, one of the reinforcing strips 14, 16 which comprises a carrier strip 20 formed from a membrane of polyester film having a thickness of 0.002 of an inch, and a plurality of continuous reinforcing filaments 21 of 6 ply 1,000 denier polyester multifilament yarn spaced relative to one another across the width of the strip at a pitch of eight ends per inch width of strip. The filaments may be bonded to the membrane by a latex plastisol, or a solvent based adhesive, or any other convenient fixative compatible with the carrier.

The spacing of the filaments across the width of the strip is not critical and the filaments may be spaced apart relatively more widely than as shown in FIG. 2, or they may be in contact with one another. When the filaments are arranged close together or in contact with one another it may be necessary to employ chemical bonding to secure the filaments to the membrane.

In a second embodiment of the invention a hose pipe is constructed substantially as described in respect of the preceding embodiment except that the reinforcing strips 30 are of a modified construction, illustrated in FIG. 3.

The reinforcing filaments 31 are bonded to a membrane of synthetic or thermoplastic rubber, and are each formed from a strip slit from a molecular orientated plastics film. To form the filaments shown in FIG. 3 the strips of orientated film are each rolled along their length, but in alternative constructions the strips may be utilized in a flat or folded condition.

In other modified constructions the carrier strip may be formed from a membrane of thermoplastic polyurethane, polyvinyl chloride or other suitable material which satisfies the basic requirement of being sufficiently flexible and mouldable to form a hose in which successive layers are bonded together.

Although the preceding two embodiments describe hoses constructed by the helical winding of reinforcement strips, a hose may alternatively be constructed of reinforcement layers formed by helically winding a carrier strip around a partly formed hose and subsequently winding a plurality of reinforcing filaments onto the carrier strip so as to extend substantially parallel to the longitudinal direction of the carrier strip. The filaments are then bonded to the carrier strip prior to applying any further layers of the hose.

While in the preceding embodiments continuous reinforcing filaments of polyester yarn or orientated plastics film are utilized in the reinforcement strips, the reinforcing filaments may be of any synthetic textile material, or of spun yarn, metal wire, or glass fibers.

It is to be appreciated that the weight relationship between the filamentary reinforcing material and the membrane material is not critical. As in the arrangement described in respect of the first embodiment of the invention the weight of reinforcing filaments may be several times heavier than the weight of the carrier strip. In that particular embodiment a polyester membrane having a thickness of 0.002 of an inch is used in conjunction with 6 ply 1,000 denier polyester multifilament yarn reinforcement applied at a pitch of eight ends per one inch width of strip, and the weight of the reinforcement is therefore in the order of four times that of the membrane.

A much higher weight ratio may be obtained by the use of, for example, stranded wires of 10 ply by 0.0069 of an inch diameter applied at 10 ends per inch width of strip, the reinforcement then weighing in the order of fourteen times that of the carrier strip. These high ratios are reduced if the carrier strip is taken to include such material as may be required to adhere the reinforcement members to the carrier strip, in their correct position relative to one another. Furthermore, in certain circumstances it is likely that such high ratios may be undesirable since there may be a need for more substance to be provided in the hose wall.

The invention will, however, also provide a hose in which the hose wall is of a relatively greater substance for a particular strength of reinforcement. For example, a reinforcement strip may be formed from filaments of 2 ply 1,000 denier polyester yarns applied at a pitch of eight ends per inch across the width of a carrier strip formed from a synthetic rubber or thermoplastic membrane having a thickness of 0.010 of an inch. In this construction the carrier strip could weigh five or six times as much as the weight of the reinforcement filaments.

In a hose constructed in accordance with the present invention the reinforcing filaments are mounted on a carrier strip in the form of a membrane of polymeric material. It is therefore possible to utilize reinforcing filaments which shrink during vulcanization, without the need to provide a relatively thick lining layer of a material having a high modulus of elasticity.

The invention thus provides a hose construction which is cheaper to manufacture than a hose employing a woven fabric reinforcement, and which allows a thinner wall thickness than a hose having conventional reinforcing filaments.

Similar advantages are obtained by applying the invention to the construction of other flexible articles such as flexible belting.

Having now described my invention what I claim is:

1. A hose pipe comprising a reinforcement structure formed from at least one helically wound strip of reinforcement material, each reinforcement strip having an elongated carrier strip formed from a membrane of polymeric material, said polymeric material having a thickness not exceeding 0.010 of an inch and an elongation at break in any direction of not more than 100 per cent, and a plurality of reinforcing filaments extending substantially parallel to the longitudinal direction of the carrier strip and applied to the surface only of said carrier strip.

2. A hose pipe according to claim 1 wherein the reinforcing filaments extend only in the longitudinal direction of the carrier strip.

3. A hose pipe according to claim 1 wherein the reinforcement structure comprising a plurality of reinforcement layers each formed from a helically wound strip of reinforcement material, the reinforcement material in the successive layers being wound in an opposite sense relative to one another.

4. A hose pipe according to claim 1 wherein the reinforcing filaments are spaced relative to one another across the width of the carrier strip.

5. A hose pipe according to claim 1 wherein the reinforcing filaments are arranged to extend parallel and in contact with one another along the longitudinal direction of the carrier strip.

6. A hose pipe according to claim 1 wherein the reinforcing filaments are continuous filaments of synthetic textile material.

7. A hose pipe according to claim 1 wherein the reinforcing filaments are continuous filaments of spun yarn.

8. A hose pipe according to claim 1 wherein the reinforcing filaments are continuous filaments of metal wire.

9. A hose pipe according to claim 1 wherein the reinforcing filaments are continuous filaments of glass fiber.

10. A hose pipe according to claim 1 wherein the weight of the reinforcing filaments is greater than that of the carrier strip.

11. A hose pipe according to claim 1 wherein the weight of the carrier strip is greater than or equal to the weight of the reinforcing filaments.

* * * * *